(12) United States Patent
Falk

(10) Patent No.: US 7,852,259 B2
(45) Date of Patent: Dec. 14, 2010

(54) CLUTTER FILTERING

(75) Inventor: Kent Olof Falk, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1184 days.

(21) Appl. No.: 11/487,585

(22) Filed: Jul. 17, 2006

(65) Prior Publication Data

US 2010/0259441 A1 Oct. 14, 2010

Related U.S. Application Data

(63) Continuation of application No. PCT/SE2004/000077, filed on Jan. 23, 2004, and a continuation-in-part of application No. 10/557,466, filed on Nov. 18, 2005, now Pat. No. 7,573,419.

(51) Int. Cl.
*G01S 13/00* (2006.01)

(52) U.S. Cl. .................. 342/159; 342/118; 342/145; 342/189

(58) Field of Classification Search .......... 342/118, 342/145, 159, 189
See application file for complete search history.

(56) References Cited

U.S. PATENT DOCUMENTS

| | | | |
|---|---|---|---|
| 3,281,842 A | 10/1966 | Cerer et al. | |
| 3,346,862 A | 10/1967 | Raudeep | |
| 3,441,931 A | 4/1969 | Shrader | |
| 4,042,928 A * | 8/1977 | Altes | 342/192 |
| 4,099,182 A | 7/1978 | Ward | |
| 4,114,153 A | 9/1978 | Neidell | |
| 4,150,378 A | 4/1979 | Barton | |
| 4,450,531 A | 5/1984 | Kenyon et al. | |
| 4,644,356 A | 2/1987 | Yamano | |
| 4,719,468 A | 1/1988 | Jehle et al. | |
| 4,894,660 A | 1/1990 | Thomson et al. | |
| 5,093,670 A | 3/1992 | Braathen | |
| 5,140,332 A | 8/1992 | Martin et al. | |
| 5,210,820 A | 5/1993 | Kenyon | |
| 5,351,053 A | 9/1994 | Wicks et al. | |
| 5,446,461 A | 8/1995 | Frazier | |

(Continued)

FOREIGN PATENT DOCUMENTS

| | | |
|---|---|---|
| RU | 2101717 | 10/1988 |
| RU | 2166769 | 10/2001 |

OTHER PUBLICATIONS

European communication mailed Mar. 9, 2010 in corresponding European Application No. 04 704 783.2—2220.

(Continued)

*Primary Examiner*—Thomas H Tarcza
*Assistant Examiner*—Timothy A Brainard
(74) *Attorney, Agent, or Firm*—Nixon & Vanderhye P.C.

(57) ABSTRACT

Clutter filtering of broadband radar signals is performed by obtaining a measure of the impedance of an echo target. A distance resolution is selected and then a power spectrum is calculated for the necessary transmitting signal. Further a target area profile $\rho(\tau)$ is estimated by utilising a correlation between the radiated signal and the received signal in form of a convolution. The target impedance is then calculated, and thereafter, the target can be filtered out using the achieved impedance characterising the echo of the target.

12 Claims, 1 Drawing Sheet

U.S. PATENT DOCUMENTS

| | | | |
|---|---|---|---|
| 5,519,400 | A | 5/1996 | McEwan |
| 5,644,314 | A | 7/1997 | Ahmad et al. |
| 5,734,346 | A | 3/1998 | Richardson et al. |
| 5,877,726 | A | 3/1999 | Kudoh et al. |
| 6,014,099 | A | 1/2000 | Bennett et al. |
| 6,075,479 | A | 6/2000 | Kudoh |
| 6,114,987 | A | 9/2000 | Bjornholt |
| 6,115,113 | A | 9/2000 | Flockencier |
| 6,131,013 | A | 10/2000 | Bergstrom et al. |
| 6,147,658 | A | 11/2000 | Higashi et al. |
| 6,397,154 | B1 | 5/2002 | Jones et al. |
| 6,518,914 | B1 | 2/2003 | Peterson et al. |
| 6,539,308 | B2 | 3/2003 | Monk et al. |
| 7,065,162 | B1 | 6/2006 | Sorrells et al. |
| 7,109,939 | B2 | 9/2006 | Lynch et al. |
| 2002/0085624 | A1 | 7/2002 | Lomp |
| 2002/0190915 | A1 | 12/2002 | Barnes et al. |
| 2003/0063597 | A1 | 4/2003 | Suzuki |
| 2004/0066331 | A1 | 4/2004 | Poullin |
| 2006/0087471 | A1* | 4/2006 | Hintz ............... 342/22 |
| 2006/0109173 | A1 | 5/2006 | Erikmats et al. |

OTHER PUBLICATIONS

E.K. Walton, "Future Concepts for Ground Penetrating Noise Radar", in: Ann Franchois (Ed.): PIERS Workshop on Advances in Radar Methods—A Collection of Slides, Jul. 1998, Joint Research Centre of the European Commission, Ispra (Italy), XP007912036.

B.M. Horton: "Noise-Modulated Distance Measuring Systems", Proceedings of the I.R.E., vol. 46, No. 5, May 1, 1959, pp. 821-828, XP011156578, ISSN: 0096-8390.

Albrecht Möschwitzer: "Formeln der Electrotechnik und Elektronik", 1989, VEB Verlag Technik, Berlin, ISBN: 3341004807, pp. 242-243, XP007912037.

International Search Report for PCT/SE2004/000077 dated Aug. 26, 2004.

U.S. Patent Application to Falk, U.S. Appl. No. 10/557,466, filed Nov. 18, 2005.

Translation of Decision on Grant mailed Feb. 29, 2008 in corresponding Russian Application No. 2006119635/09(021336).

International Search Report for PCT/SE03/00833 dated Dec. 8, 2003.

International Search Report for PCT/SE2003/001616 dated Feb. 18, 2004.

Strifors et al., *Scattering of short EM-pulses by simple and complex targets in the combined time-frequency domain using impulse radar*, Record of the 1993 IEEE National Radar Conference, Apr. 20-22, 1993, pp. 70-75.

Anderson et al., *Ultra-wideband beamforming in sparse arrays*, Microwaves, Antennas and Propagation, IEEE Proceedings H, vol. 138, No. 4, Aug. 1991, pp. 342-346.

U.S. Appl. No. 10/557,768, filed Nov. 21, 2005, Inventor: Kent Olof Faulk.

Office Action mailed Jun. 21, 2007 in co-pending U.S. Appl. No. 10/557,768.

Office Action mailed Dec. 7, 2007 in co-pending U.S. Appl. No. 10/557,768.

Office Action mailed Jul. 2, 2008 in co-pending U.S. Appl. No. 10/557,768.

Office Action mailed Feb. 26, 2008 in co-pending U.S. Appl. No. 10/557,466.

Office Action mailed Jul. 17, 2008 in co-pending U.S. Appl. No. 10/577,466.

* cited by examiner

CLUTTER FILTERING

RELATED APPLICATIONS

This application is a continuation of commonly-assigned PCT/SE2004/000077, filed on Jan. 23, 2004 and is a continuation in part of commonly-assigned U.S. patent application Ser. No. 10/557,466, filed on Nov. 18, 2005 now U.S. Pat. No. 7,573,419. The entire contents of these applications are incorporated herein by reference.

TECHNICAL FIELD

The technical field relates to a method for differentiating echoes from valid radar targets of interest from targets of no interest as well as disturbances considered as clutter.

BACKGROUND

A desire to be able to distinguish targets from clutter has always has been an objective with radar sensors. Traditionally this has been based on the fact that the velocity of a moving target will be different from background disturbances such as present clutter. Clutter echoes may, for instance, result from small gradients in a surrounding medium like air or a surrounding water surface. Therefore different Doppler filters have been developed to solve this task.

Thus, all present solutions generally seem to be based on the Doppler signal information extracted from received echo signals. However typical solutions of today utilise coded long pulses, for instance using a binary phase code or spread spectrum signals operating at large receiver bandwidths. Some of these signals resemble signal noise or clutter signals or a jamming signal source.

Such broadband signal radar signals generally do not exhibit a pronounced carrier, which means that a regular velocity filtering can not take place using ordinary Doppler methods. However, with new broadband radar systems there will be further possibilities to measure other echo parameters and to construct filters which, for instance, may directly filter out reflections from objects having metallic surfaces and separate those for example from those targets with generally non-metallic surfaces.

SUMMARY

Clutter filtering of broadband radar signals is performed by obtaining a measure of the impedance of an echo target. A distance resolution is then selected, and a power spectrum is calculated for the necessary transmitting signal. Further, a target area profile $\rho(\tau)$ is estimated by utilising a correlation between the radiated signal and the received signal in form of a convolution. The target impedance thereafter is calculated as a function of time using the relation $$Z(\tau) = Z_0 \frac{1+\rho(\tau)}{1-\rho(\tau)}$$

where $Z_0$ is the impedance of free space. Thereafter, by means of the achieved impedance characterising the echo of the target, the target can be filtered out.

DETAILED DESCRIPTION

In the following description, for purposes of explanation and non-limitation, specific details are set forth, such as functional entities, techniques, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual functions are shown in blocks in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
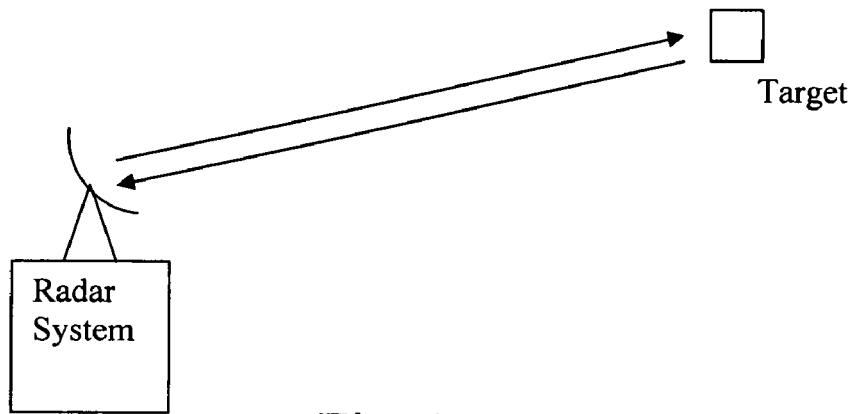
FIG. 1 illustrates an example radar system.

FIG. 1 illustrates an example radar system for detecting a target. The radar system includes conventional transmission, reception, and processing circuitry. As indicated above, new broadband radar systems open up possibilities for measuring also other parameters, for example an indication of impedance of the targets and then constructing filters which filter out, for instance, reflections from metallic objects (Z=0).

To simplify calculations, suppose a bandwidth limited broadband noise signal having an average value equal to zero in accordance with:

$$s(t) = s_I(t) \cdot \cos(2\cdot\pi\cdot f_0 \cdot t) - s_Q(t) \cdot \sin(2\cdot\pi\cdot f_0 \cdot t) \quad (1)$$

where $s_I(t)$ and $s_Q(t)$ are two Gaussian noise processes and $f_0$ is the centre frequency. Gaussian noise has a large amplitude variation, which means that an amplitude-limited transmitter will be ineffectively used. Phase modulated noise of the type $s(t)=\cos[\omega_0 t+\theta(t)]$ having some suitable statistical distribution may therefore in practice be more preferable. Equation (1) may then alternatively be written:

$$s(t) = A(t) \cdot \cos[2\cdot\pi\cdot f_0\cdot t + \phi(t)] \quad (2)$$

The envelope function A(t) is Rayleigh distributed and given by:

$$A(t) = \sqrt{s_I^2(t) + s_Q^2(t)} \quad (3)$$

The phase function $\phi(t)$ is equally distributed over the interval $[-\pi, \pi]$, and given by:

$$\phi(t) = \tan^{-1}\left[\frac{s_Q(t)}{s_I(t)}\right] \quad (4)$$

We also may represent the signal in a complex analytical form according to:

$$s(t) = \frac{1}{2} \cdot [s_c(t) \cdot e^{j \cdot 2\pi \cdot f_0 \cdot t} + s_c^*(t) \cdot e^{-j \cdot 2\pi \cdot f_0 \cdot t}] \quad (5)$$

Suppose that the radar station is stationary and transmits an ergodic wave form s(t) with an average value of zero. Ergodic theory can best be described as the statistical and qualitative behaviour of measurable group and semi-group action on a measurable space possessing a non-negative measure. (Ergodic theory has its origins in the work of Boltzman in statistical mechanics problems where time- and space-distribution averages are equal.) This adoption simplifies the calculations, but implies still no limitation. A moving radar station having the velocity v implies that time is scaled according to $t(\tau)=t_0+2\cdot v\cdot\tau/c_0$. The received signal from the reflection profile $\rho(\tau)$ for the distance 0 to $R_{max}$ can be written according to:

$$r(t) = \int_0^{\frac{2 \cdot R_{max}}{c_0}} \rho(\zeta) \cdot s(t-\zeta) \cdot d\zeta + n(t) \quad (6)$$

where $c_0$ is the velocity of light and n(t) represents additive noise and possible disturbances. The reflection profile $\rho(\tau)$ lies within the unity circle in the complex plane and represents the sum of all subset reflections within the resolution cell. For a resolution cell for instance constituting a mix of air and metal the reflection profile $\rho(\tau)$ will be a sum of contributions having a reflection coefficient of 0 and −1, respectively. Thus, the resulting reflection coefficient will be positioned along the line between 0 and −1.

According to the theory of ergodic processes, r(t) also becomes stationary and ergodic. Therefore time correlation may be utilised to approximate the cross correlation between a time delayed copy of the conjugate of the transmit signal s*(t−ζ) and the received signal r(t) according to:

$$g_T(t, \tau) = \int_{-\frac{T}{2}}^{\frac{T}{2}} \int_0^{\frac{2 \cdot R_{max}}{c_0}} \rho(\zeta) \cdot s(t-\zeta) \cdot s^*(t-\tau) \cdot d\zeta \cdot dt + \int_{-\frac{T}{2}}^{\frac{T}{2}} n(t) \cdot s^*(t-\tau) \cdot dt \quad (7)$$

where T represents the correlation of the integration interval. For a large T the second term in Eq. (7) will go towards zero since n(t) is not correlated to the transmit signal s(t). This gives:

$$g(\tau) = \lim_{T \to \infty} g_T(t) = \int_0^{\frac{2 \cdot R_{max}}{c_0}} \rho(\zeta) \cdot p(\tau-\zeta) \cdot d\zeta = \rho(\tau) \otimes p(\tau) \quad (8)$$

⊗ symbolises a convolution. Besides it is valid that:

$$p(\tau) = \lim_{T \to \infty} \int_{-\frac{T}{2}}^{\frac{T}{2}} s(t) \cdot s^*(t-\tau) \cdot dt \quad (9)$$

where $p(\tau)$ is the auto correlation function of the radiated noise signal s(t). It comes from Eq. (8) that the received signal is the convolution between the reflection profile and the auto correlation function of the radiated signal. Thus the distance resolution is given by the auto correlation function $p(\tau)$ of the transmit signal, which depends on the bandwidth of the transmit signal and the form of its power spectrum $P(\omega)$. There is a simple relation between the auto correlation function $p(\tau)$ of the signal and its power spectrum $P(\omega)$, since these two expressions form a pair of Fourier transforms:

$$\left. \begin{array}{l} P(\omega) = \int_{-\infty}^{\infty} p(\tau) \cdot e^{-j\omega\tau} \cdot d\tau \\ p(\tau) = \frac{1}{2 \cdot \pi} \int_{-\infty}^{\infty} P(\omega) \cdot e^{j\omega\tau} \cdot d\omega \end{array} \right\} \quad (10)$$

Consequently it is possible to select a distance resolution $p(\tau)$ and calculate the power spectrum $P(\omega)$ for the necessary transmit signal. A convolution in the time domain then corresponds to a multiplication in the frequency domain. Therefore the target area profile $\rho(\tau)$ can be estimated according to:

$$\rho(\tau) = F^{-1}\left\{\frac{F[g(\tau)]}{F[p(\tau)]}\right\} = F^{-1}\left\{\frac{F[g(\tau)]}{p(\omega)}\right\} \quad (11)$$

and the impedance as a function of time (distance) can be calculated according to:

$$Z(\tau) = Z_0 \frac{1 + \rho(\tau)}{1 - \rho(\tau)} \quad (12)$$

where $Z_0 = (\mu_0/\epsilon_0)^{1/2}$ is the impedance of free space (120·π or ≈377 ohms). The time τ can be recalculated into distance R according to:

$$R = \frac{c_0 \cdot \tau}{2} \quad (13)$$

As already mentioned, metallic objects are characterised by $\rho=-1$ and $Z=0$. Thus, a target having another typical reflection coefficient and impedance can be filtered out in the same way as in the example with metallic objects. However it should be noted that the reflection coefficient of each individual resolution cell represents the sum of all partial reflections within the cell. In practice a threshold value representing a certain distance from the origin of coordinates need to be exceeded in order to obtain a detection of the impedance of an echo. The angle within the complex plane for the detection concerned decides the phase of the sum of partial reflection within the resolution cell. For instance a dominating metallic contribution will result in an angle close to −π.

Generally it is valid that the impedance for an object is given by its conductivity σ, dielectric constant ϵ and the permeability μ according to:

$$Z(\omega, \sigma, \varepsilon_r, \mu_r) = \sqrt{\frac{j \cdot \omega \cdot \mu_r \cdot \mu_0}{\sigma + j \cdot \omega \cdot \varepsilon_r \cdot \varepsilon_0}} \quad (14)$$

The detection of metallic objects is extremely simple since the frequency dependency of Eq. (14) vanish as →$Z(\omega, \sigma, \epsilon_r, \mu_r)=0$.

Figure 2:
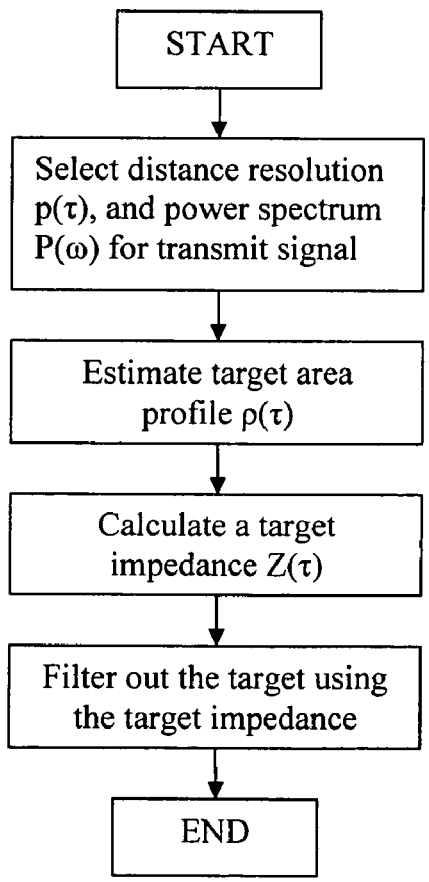
FIG. 2 illustrates an example step of procedures for implementing clutter filtering.

FIG. 2 illustrates in flowchart form example procedures for clutter filtering broadband radar signals. The distance resolution and power spectrum are selected for transmitting a signal. The target area profile is then estimated. A target impedance is calculated, and the target is filtered out using that target impedance.

Filtering the target impedance using this approach permits echoes from a metallic target to be extracted even in a situation with a stationary target against a stationary background clutter. A standard Doppler detection would not be able to distinguish the target from the background clutter in this situation.

For further separation of an achieved target impedance from another detected impedance, other conventional filtering methods may be used, which are well known to a person skilled in the art.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the to claims. The extent of legal protection is defined by the words recited in the allowed claims and their equivalents. No claim is intended to invoke paragraph 6 of 35 USC §112 unless the words "means for" are used.

The invention claimed is:

1. A method for creating a tool for clutter filtering of broadband radar signals by obtaining a measure of an impedance of a target, wherein the method comprises the steps of:
selecting a distance resolution ($p(\tau)$);
calculating a power spectrum ($P(\omega)$) for a necessary transmit signal;
estimating a target area profile ($\rho(\tau)$) by using a correlation ($g(\tau)$) between a radiated signal and received signal;
calculating a target impedance $Z(\tau)$ as a function of time using a relation $$Z(\tau) = Z_0 \frac{1+\rho(\tau)}{1-\rho(\tau)}$$

where $Z_0$ is the impedance of free space; and
filtering out the target using the target impedance.

2. The method according to claim 1, further comprising:
calculating the correlation ($g(\tau)$) between the radiated signal and received signal as a convolution of the target area profile ($\rho(\tau)$) and the distance resolution ($p(\tau)$).

3. The method according to claim 1, further comprising:
recalculating the time ($\tau$) into distance (R) using the fact that $R=c_0 \cdot \tau \cdot \frac{1}{2}$, where $c_0$ is the velocity of light.

4. The method according to claim 1, further comprising:
visualizing an angle of the target impedance being the sum of partial reflections within a resolution cell using a complex presentation plane,
wherein a dominating metallic contribution of the detected target echo results in an angle close to $-\pi$.

5. A radar system comprising:
means for selecting a distance resolution ($p(\tau)$);
means for calculating a power spectrum ($P(\omega)$) for a necessary transmit signal;
means for estimating a target area profile ($\rho(\tau)$) by using a correlation ($g(\tau)$) between a radiated signal and received signal;
means for calculating a target impedance $Z(\tau)$ as a function of time using a relation $$Z(\tau) = Z_0 \frac{1+\rho(\tau)}{1-\rho(\tau)}$$

where $Z_0$ is the impedance of free space; and
a filter for filtering out the target using the target impedance.

6. The radar system according to claim 5, further comprising:
means for calculating the correlation ($g(\tau)$) between the radiated signal and received signal as a convolution of the target area profile ($\rho(\tau)$) and the distance resolution ($p(\tau)$).

7. The radar system according to claim 5, further comprising:
means for recalculating the time ($\tau$) into distance (R) using the fact that $R=c_0 \cdot \tau \cdot \frac{1}{2}$, where $c_0$ is the velocity of light.

8. The radar system according to claim 5, further comprising:
means for visualizing an angle of the target impedance being the sum of partial reflections within a resolution cell using a complex presentation plane,
wherein a dominating metallic contribution of the detected target echo results in an angle close to $-\pi$.

9. A radar system comprising:
processing circuitry configured to perform the following:
select a distance resolution ($p(\tau)$);
calculate a power spectrum ($P(\omega)$) for a necessary transmit signal;
estimate a target area profile ($\rho(\tau)$) by using a correlation ($g(\tau)$) between a radiated signal and received signal;
calculate a target impedance $Z(\tau)$ as a function of time using a relation $$Z(\tau) = Z_0 \frac{1+\rho(\tau)}{1-\rho(\tau)}$$

where $Z_0$ is the impedance of free space, and
a filter for filtering out the target using the target impedance.

10. The radar system according to claim 9, wherein the processing circuitry is further configured to calculate the correlation ($g(\tau)$) between the radiated signal and received signal as a convolution of the target area profile ($\rho(\tau)$) and the distance resolution ($p(\tau)$).

11. The radar system according to claim 9, wherein the processing circuitry is further configured to recalculate the time ($\tau$) into distance (R) using the fact that $R=c_0 \cdot \tau \cdot \frac{1}{2}$, where $c_0$ is the velocity of light.

12. The radar system according to claim 9, wherein the processing circuitry is further configured to visualize an angle of the target impedance being the sum of partial reflections within a resolution cell using a complex presentation plane,
wherein a dominating metallic contribution of the detected target echo results in an angle close to $-\pi$.

* * * * *

UNITED STATES PATENT AND TRADEMARK OFFICE
CERTIFICATE OF CORRECTION

PATENT NO.        : 7,852,259 B2
APPLICATION NO.   : 11/487585
DATED             : December 14, 2010
INVENTOR(S)       : Falk It is certified that error appears in the above-identified patent and that said Letters Patent is hereby corrected as shown below:

In Column 2, Line 28, in Equation (1), delete "$s(t)=s_l(t)$" and insert -- $s(t) = s_l(t)$ --, therefor.

In Column 2, Line 31, delete "$s_1(t)$" and insert -- $s_l(t)$ --, therefor.

In Column 2, Line 42, in Equation (3), delete "$A(t)=\sqrt{s_1^2(t)+s_Q^2(t)}$" and insert -- $A(t)=\sqrt{s_I^2(t)+s_Q^2(t)}$ --, therefor.

In Column 4, Lines 50-51, delete "$\rightarrow Z(\omega, \sigma, \epsilon_r, \mu_r)=0.$" and insert -- $\lim_{\sigma \rightarrow \infty} Z(\omega, \sigma, \varepsilon_r, \mu_r) = 0.$ --, therefor.

In Column 5, Line 7, after "by the" delete "to".

Signed and Sealed this
Thirty-first Day of May, 2011

David J. Kappos
*Director of the United States Patent and Trademark Office*